Nov. 7, 1944.  W. C. MARSH  2,362,438
PACKLESS VALVE
Filed Sept. 23, 1943
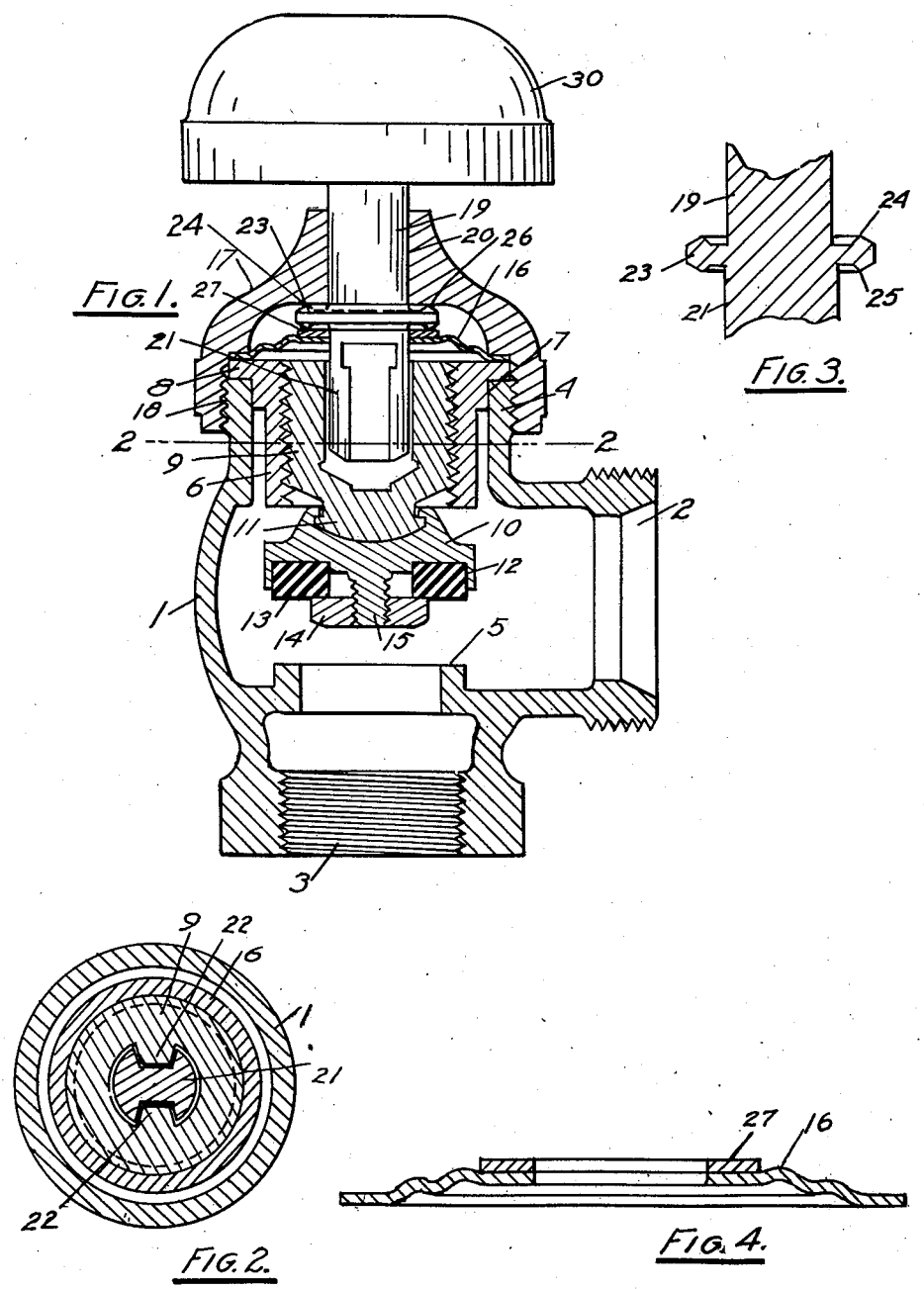
INVENTOR.
William C. Marsh
BY Florian G. Miller
Atty.

Patented Nov. 7, 1944

2,362,438

UNITED STATES PATENT OFFICE 2,362,438

PACKLESS VALVE

William C. Marsh, Dunkirk, N. Y.

Application September 23, 1943, Serial No. 503,577

1 Claim. (Cl. 251—31)

This invention relates generally to valves, and more particularly to a novel packless valve.

All valves made according to the teachings of the prior art and with which I am familiar, have had some weak point which would permit leakage after a very short time in use, especially under severe conditions. This has been particularly true of packed valves.

It is, accordingly, an object of my invention to overcome the above and other defects in valves and it is more particularly an object of my invention to provide a valve which is simple in construction, easy to assemble, economical in manufacture, and efficient in operation.

Another object of my invention is to provide a packless valve which is error-proof in assembly and in re-assembly.

Another object of my invention is to provide a spring-urged sealing plate in a valve.

Another object of my invention is to provide a packless valve whose operation is positive at any pressure.

Another object of my invention is to provide a packless valve wherein the pressure in the valve is utilized to assure more perfect seals.

Other objects of my invention will become evident from the following detailed description, taken in conjunction with the accompanying drawing, in which:

Fig. 1 is a cross-sectional view of my novel packless valve.

Fig. 2 is a view taken on the line 2—2 of Fig. 1.

Fig. 3 is an enlarged fragmentary sectional view of the stem in my novel valve.

Fig. 4 is a cross-sectional view of the spring member in my novel valve.

Referring now to the drawing, Fig. 1 shows my novel valve comprising a body portion 1 having ports 2 and 3, open end 4 and an annular seating portion 5. An internally threaded cylindrical member 6 having an offset portion 7 and an outwardly extending flange 8 depends from the top of the body portion 1 with the flange 8 seating on the upper open end 4 of the body 1. An externally threaded member 9 is threadably engaged with the threaded portion of the cylindrical member 6 and moves relative thereto. A rotatable member 10 is rotatably mounted on the extended head portion 11 of the threaded member 9. The rotatable member 10 has a grooved portion 12 for receiving a washer 13 which is held in place by a nut 14 in engagement with a threaded stem 15 integral with the rotatable member 10.

Now coming to the gist of my invention, I superpose a disc-shaped, slightly-cupped spring member 16 on the flange 8 of the cylindrical member 6 and secure it with a bonnet 17 which is threadably engaged to the outer threaded portion 18 on the upper portion of the body 1. The spring member 16 is preferably corrugated. A stem 19 with a handle 30 extends through the aperture 20 in the bonnet 17. The lower end 21 of the stem 19 is slotted to engage lugs 22 on the threaded member 9 for rotation thereof. A flange 23 having opposed line contacting surfaces 24 and 25 (Fig. 3) is disposed centrally of the stem 19. The upper line contacting surface 24 of the flange 23 engages the machined surface 26 of the bonnet 17 in sealing relationship. The lower surface 25 of the flange 23 engages an annular ring 27 of relatively soft material such as soft copper, in sealing relationship. The ring 27 is secured to the disc-shaped member 16 by welding or any other suitable method.

In operation, the disc-shaped spring member 16 continually urges the ring 27 in engagement with the lower line contacting surface 25 and in turn the upper line contacting surface 24 is urged into engagement with the machined surface 26 of the bonnet 17. It will be evident that the line contacting surfaces 24 and 25 are in constant sealing relationship with the ring 27 and the machined surface 26 of the bonnet 17 thereby preventing any leakage of fluid through the aperture in the bonnet 17. The pressure of the fluid in the valve assists the spring member 16 in forcing the ring contacting surfaces 24 and 25 in sealing relationship. Upon rotation of the stem 19, the threaded member 9 moves relative to the stationary cylindrical member 6 to move the rotatable member 10 with the washer 13 vertically into and out of engagement with the seating surface 5 to control flow of fluid through the valve. My novel valve may be used for water, steam, vapor, air or any other fluid.

It is evident that I have provided a packless valve which is very simple in construction, easy to assemble and disassemble and which is constantly sealed against leakage through the stem area of the valve.

Various changes may be made in the specific embodiment of my invention without departing from the spirit thereof, or from the scope of the appended claim.

What I claim is:

A valve comprising, in combination, a body portion having an open end and a seat, a stationary internally threaded cylindrical member having a flanged portion seating on the rim of the open end of said body portion, an externally threaded cylindrical member threadably engaged with said internally threaded cylindrical member and movable relative thereto, a seating member rotatably secured to said last mentioned cylindrical member for engagement with said seat, a corrugated cup-shaped disc-type spring seating on the flanged portion of said cylindrical member, a bonnet having a machined seating surface for securing said spring and said flanged cylindrical member to said body portion, a valve stem extending through said spring and bonnet and having a collar disposed between said spring and said bonnet and being provided with opposed line bearing surfaces, and a comparatively soft bearing member welded on the bonnet side of said spring, said spring constantly urging said soft bearing member into sealing engagement with one of said bearing surfaces and the other of said bearing surfaces into engagement with the machined surface of said bonnet.

WILLIAM C. MARSH.